Jan. 4, 1966  G. D. JOHNSON  3,227,804
UNDERWATER CAMERA MOUNTING SYSTEM
Filed Feb. 25, 1963  6 Sheets-Sheet 1
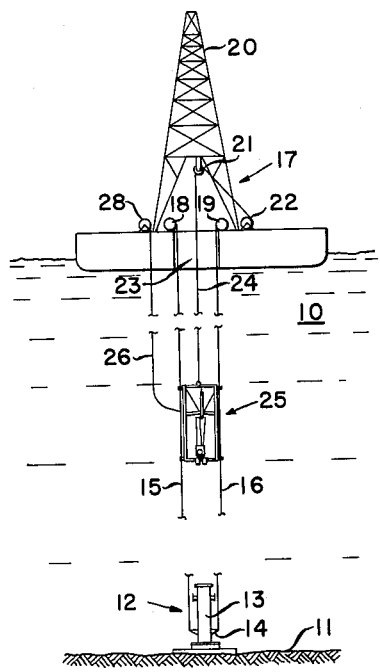
FIG. 1
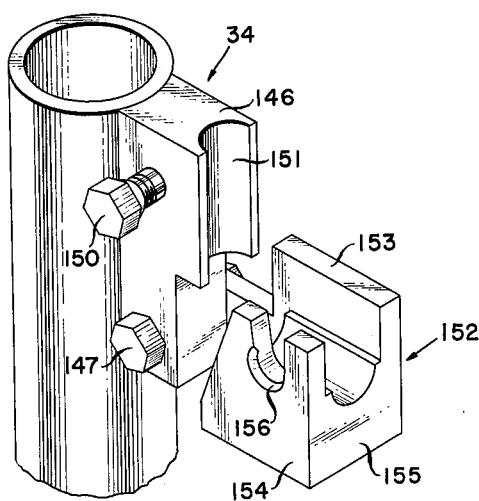
FIG. 12
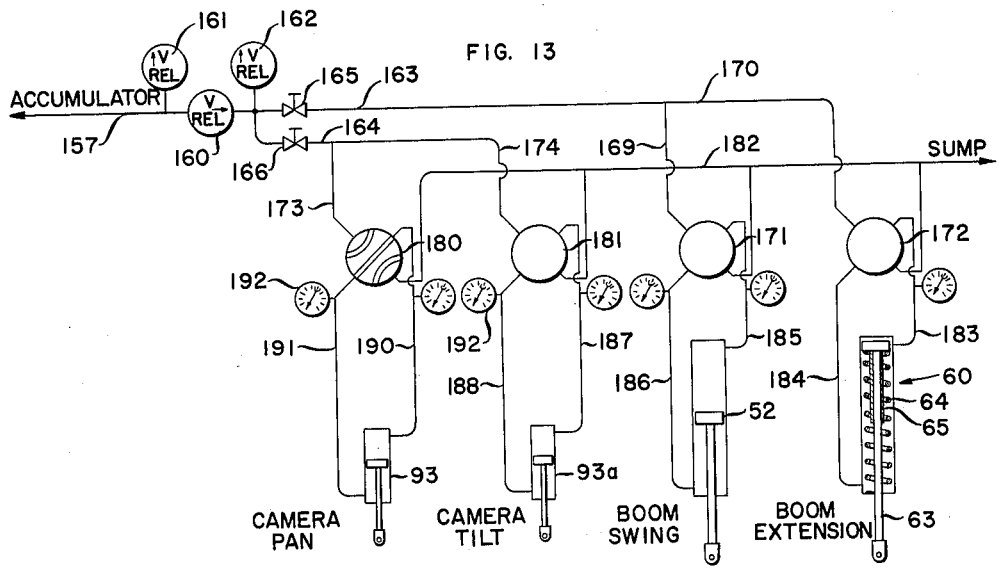
INVENTOR:
GLENN D. JOHNSON
BY:
HIS ATTORNEY Jan. 4, 1966  G. D. JOHNSON  3,227,804
UNDERWATER CAMERA MOUNTING SYSTEM
Filed Feb. 25, 1963  6 Sheets-Sheet 2

INVENTOR:
GLENN D. JOHNSON
BY: John K. Wilkens
HIS ATTORNEY

INVENTOR:
GLENN D. JOHNSON
HIS ATTORNEY

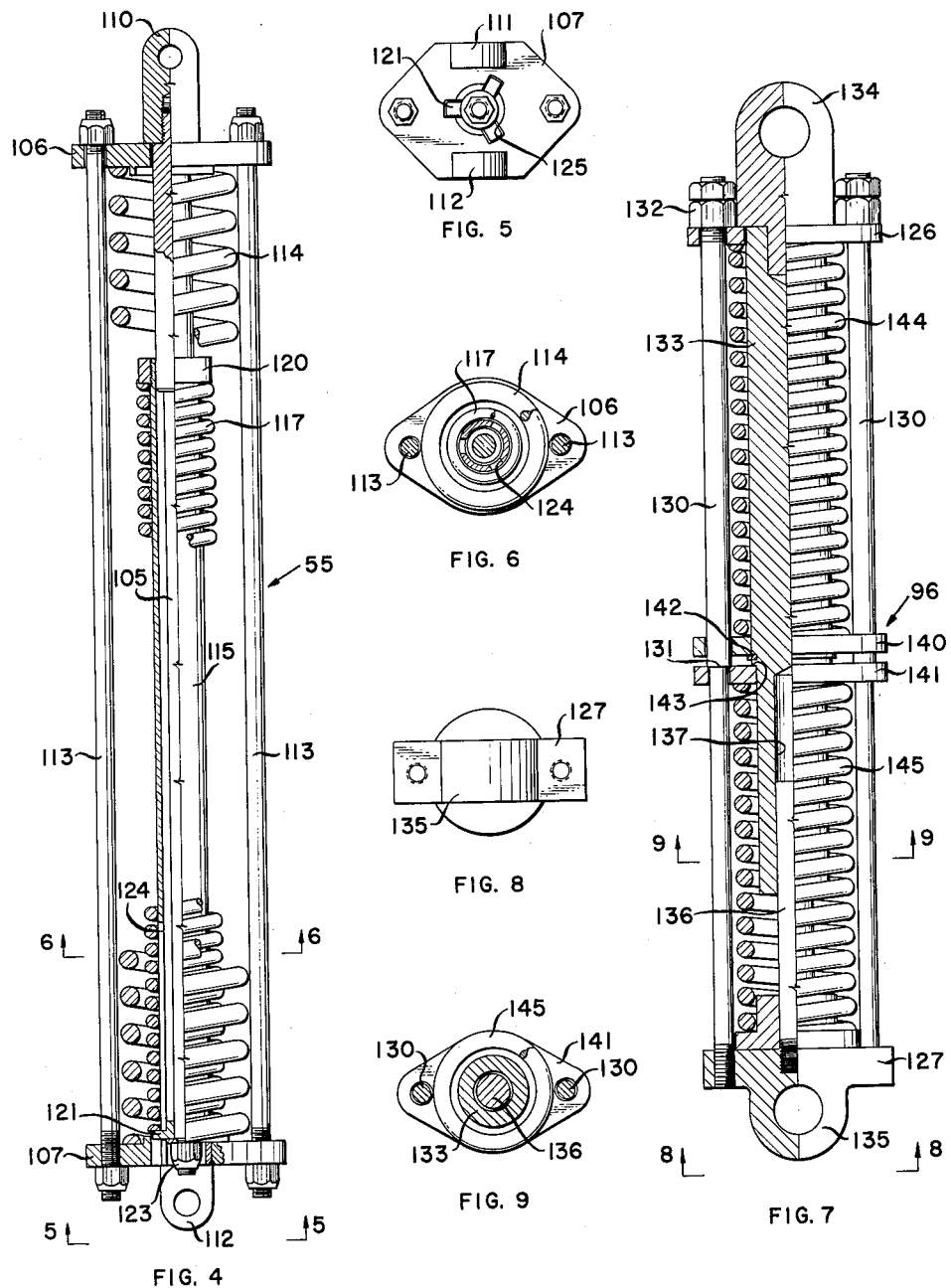

INVENTOR:
GLENN D. JOHNSON
BY: *John R. Wilkens*
HIS ATTORNEY

INVENTOR:
GLENN D. JOHNSON
BY: *John K. Wilkins*
HIS ATTORNEY

United States Patent Office 3,227,804
Patented Jan. 4, 1966

3,227,804
UNDERWATER CAMERA MOUNTING SYSTEM
Glenn D. Johnson, Downey, Calif., assignor to Shell Oil Company, New York, N.Y., a corporation of Delaware
Filed Feb. 25, 1963, Ser. No. 260,673
7 Claims. (Cl. 178—6)

The present invention relates to an apparatus and system for observing installations submerged in relatively deep bodies of water. More particularly, the invention is directed to an apparatus and system to be used for the observation of drilling and production operations being carried out on wells located at offshore locations. It is also anticipated that the system will be of use for observing geological investigations being carried out in relatively deep bodies of water and for observing underwater producing and trap farm installations.

In recent attempts to locate new oil fields, an increasing amount of well drilling is being conducted at offshore locations, such for example, as off the coasts of Louisiana, Texas and California. These operations have shown it to be desirable to utilize methods and apparatus for well drilling and completion wherein both the well casinghead and subsequently the wellhead assembly and casinghead closure device are located underwater. This arrangement is found desirable since the well structure does not impose the hazard to navigation, nor is it subject to the corrosive action of salt water spray and air. Furthermore, when operating in depths ranging in hundreds of feet, this arrangement becomes absolutely necessary, since the extension of well strings to the surface of the body of water becomes infeasible as a practical matter.

Preferably, in the underwater completion of offshore wells the casinghead and wellhead closure assemblies are located close to the ocean floor to avoid all of the disadvantages accompanying the extension of lengths of well string above the floor of the ocean. When locating equipment in this manner, depth are often encountered exceeding the relatively shallow depth at which a diver can safely and easily operate and, thus, it has become necessary to design new equipment and procedures for this purpose. Copending application Serial No. 830,538 of John A. Haeber and Lloyd G. Otteman, filed July 30, 1959 and entitled "Underwater Well Completion Method," describes a method of completing offshore wells on the ocean floor.

With the above-mentioned underwater completion procedure, and in situations where the depth of water being worked is greater than 50 feet, it has been found desirable, if not absolutely necessary, to carry out drilling, completion, producing and workover operations from floating stations located at the surface of the body of water above the formation being worked. When working wells in this manner, difficulties are encountered in running equipment to and from the well and operating structures secured to the well, such as producing wellhead assemblies. These difficulties result largely from the relative movement which takes place between the floating station and the underwater well as a result of wind and wave action on the station. The difficulties become particularly acute when lowering new components to the underwater well installation, or when relocating the well to continue drilling or perform workover operations previously interrupted for some reason.

In an effort to avoid the problems encountered in the operation of offshore wells and floating stations, various types of guide systems have been developed and used for carrying wellhead components and/or operating apparatus to and from underwater well installations. These systems have not, however, proved infallible and it is often desirable to make visual observation of the underwater well installation and the equipment being used in combination therewith. For example, where the underwater installation includes remotely operable production apparatus, this apparatus may become fouled and, thus, ineffective for proper control of the well. The present invention is designed to utilize existing guide systems to facilitate the visual observation of underwater installations and to thus make the operation of such installations possible under even the most adverse conditions. Specifically, the invention is designed for use with underwater installations having guide lines extending therefrom to floating operating stations.

Therefore, it is a broad object of this invention to provide a means to observe remote installations submerged under deep bodies of water, and thus facilitate the operation of these installations.

Another object of the invention is to provide a means of remotely observing installations submerged in considerable depths of water through the use of the guidance and operating systems already in use with such installations.

Another and more specific object of the invention is to provide an apparatus to support an underwater camera for controlled remote positioning and operation while utilizing relatively inexpensive operating components.

Yet another object of the invention is to provide an underwater observation system including remotely operable positioning means to facilitate the observation of specific underwater locations.

The above and other objects of the invention are accomplished through means of a system including an operating station located at the surface of a body of water substantially above the position of an underwater installation desired to be observed, and at least one guide line extending between the station and the installation. A carriage is slidably engaged on the guide line and has secured thereto means for selectively controlling its depth within the body of water. A boom is pivotally mounted on the carriage for universal movement with respect thereto to facilitate lateral projection of a portion of the boom from the carriage. The boom has a camera mounted on the projectable portion thereof and motion-imparting elements operatively engage both the carriage and boom to selectively pivot the boom with respect to the carriage. Transmission means cooperate between the operating station and carriage to transmit images from the camera to the station and operating signals from the station to the motion-imparting elements. The transmission means and the components cooperating therewith are controlled through selectively operable control elements carried by the operating station.

More specifically, the boom is mounted on the carriage for pivotal movement with respect thereto about a pair of substantially normal axes. Furthermore, means are operatively associated with the carriage and camera to maintain the camera normally in a fixed planar orientation with respect to the carriage. In a specific structure of the system, the camera is pivotally mounted on the projectable portion of the boom for universal movement with respect thereto and motion-imparting mechanisms operatively engage the boom and camera to selectively pivot the camera about these axes. As a result of the pivotal mounting between the boom and carriage and the boom and camera, and the motion-imparting means cooperating with these mountings, the camera may be utilized to observe a plurality of surfaces of any object spaced from the carriage within the focal area of the camera.

The objects, utility and operation of this invention will be more easily ascertained from the following detailed description when taken in conjunction with the accompanying drawings, in which:

FIGURE 1 is a diagrammatic elevational view illustrating an underwater well installation having a floating operating station positioned thereabove, which installation and station have guide lines extending therebetween to which the carriage of the system of the present invention may be applied;

FIGURE 4 is a detailed vertical half-section of the spring cell adapted to return the boom in the neutral position illustrated in FIGURE 2;

Figure 10:
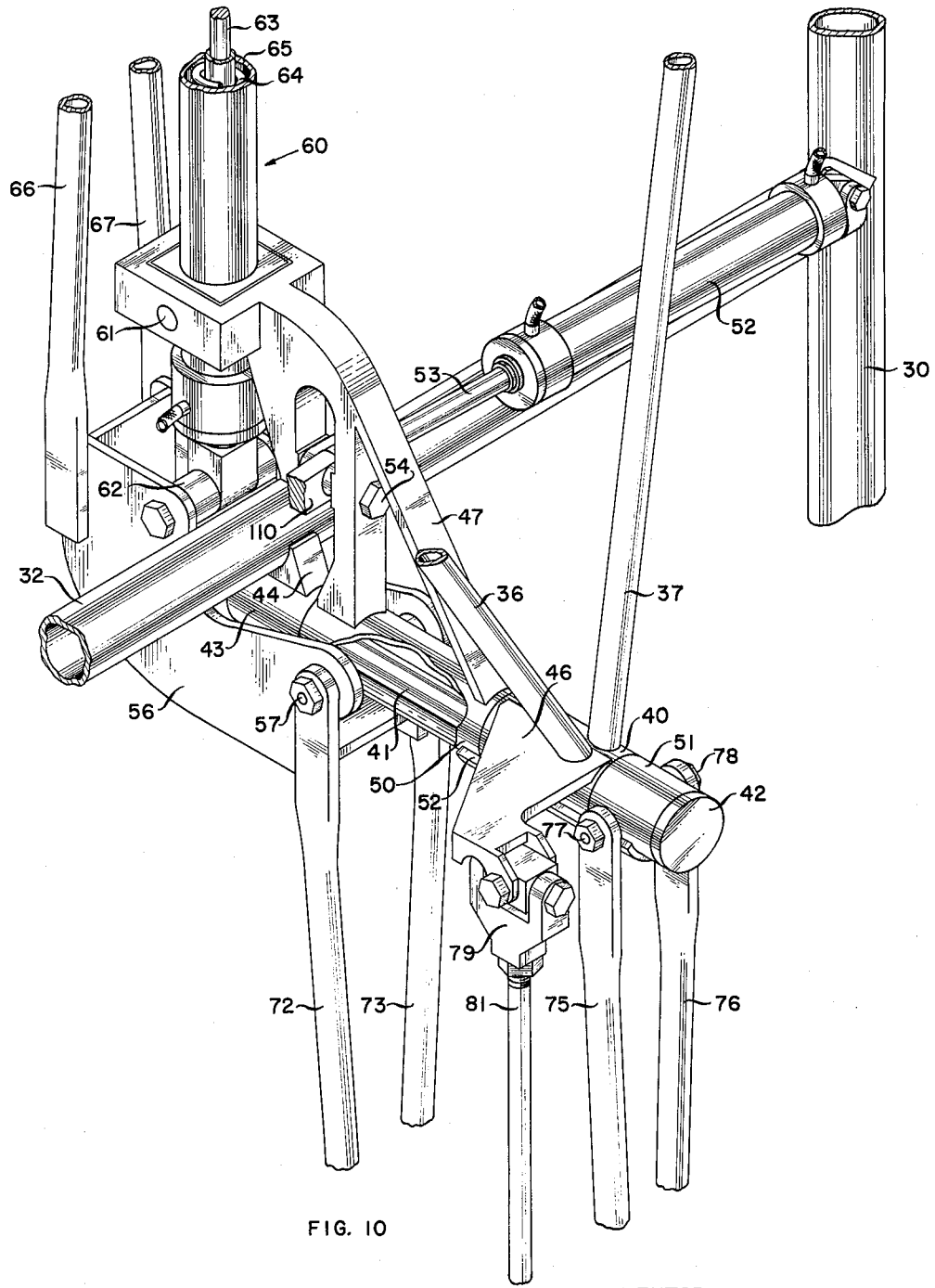
Figure 11:
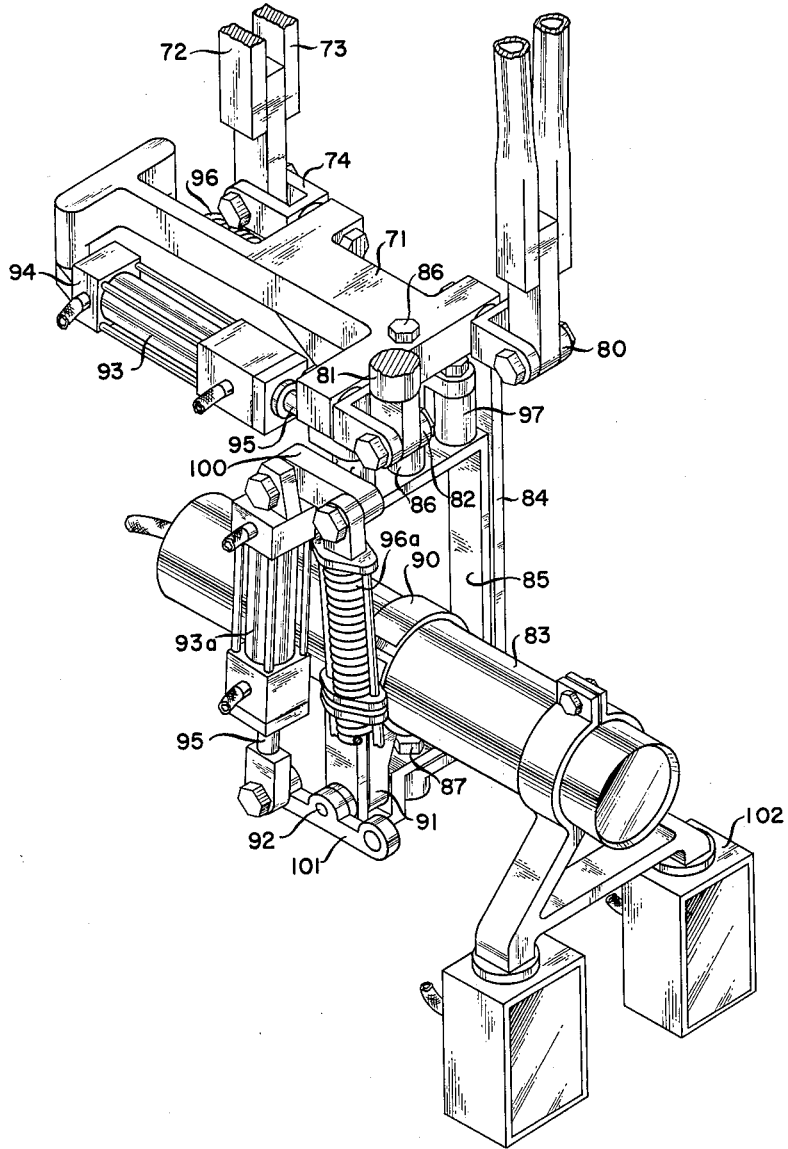

FIGURES 5 and 6 are views taken on lines 5—5 and 6—6, respectively, of FIGURE 4;

FIGURE 7 is a detailed vertical half-section of one of the spring cells adapted to return the camera of the system to the neutral position on its pivotal mounting with the boom;

FIGURES 8 and 9 are views taken of lines 8—8 and 9—9, respectively, of FIGURE 7;

FIGURE 10 is a perspective view of the pivotal mounting between the boom and carriage;

FIGURE 11 is a perspective view of the pivotal mounting between the camera and the boom;

FIGURE 12 is a perspective view of a guide line receiver secured to the carriage, shown in its open position; and, FIGURE 13 is a schematic view diagrammatically illustrating the fluid actuated operators of the carriage and the control system therefor.

Referring now to FIGURE 1 in detail, therein is illustrated a body of water 10 having a floor 11 on which an underwater installation in the form of a production assembly 12 is positioned. The production assembly 12 is fixed to the floor 11 through means of a casing string (not shown) extending downwardly therefrom into cemented engagement with the formation below the floor 11. As illustrated, the production assembly includes a casinghead and valve unit 13 extending upwardly from the floor 11. Guide line receivers 14 are fixed to and extend laterally from the unit 13 and have secured thereto flexible guide lines 15 and 16 which extend upwardly through the body of water 10 to a floating operating station 17. Through means of the guide lines 15 and 16, components and operators may be moved between the operating station and the production assembly.

The operating station 17 illustrated in FIGURE 1 is typical of those used in offshore drilling and production operations and includes a derrick 20 mounted in an upwardly extending position and a pulley 21 carried by the derrick. A winch 22 is mounted on the station and cooperates with the pulley 21 to facilitate the raising and lowering of elements to and from the station. A well or opening 23 extends through the operating station directly below the derrick 20 and is open to the body of water in which the station floats. It is through this well that the guide lines 15 and 16 extend into secured relationship with the operating station. Preferably, the lines 15 and 16 are secured to the station through winches 18 and 19 carried thereby. In order to maintain the station 17 at a location approximately directly above the underwater installation, anchor lines (not shown) may be extended down from the station to heavy anchors positioned on the floor 11 at locations around the installation.

The winch 22 of FIGURE 1 has a flexible cable 24 operatively secured thereto and extending therefrom over the pulley 21 and down through the well 23 to an observation carriage 25 slidably received on the guide lines 15 and 16. The structure of the carriage 25, to which the present invention is primarily directed, will be developed subsequently with respect to the more detailed figures of the drawings. The flexible cable 24, the pulley 21 and winch 22 cooperating therewith provide for the selective raising and lowering of the carriage 25 on the guide lines 15 and 16. In addition to the cable 24, a flexible conduit 26 is operatively secured to the carriage 25 and extends to the station 17. Preferably, the flexible conduit 26 is secured to the station 17 through means of a reeling mechanism 28 whereby the length of the flexible conduit may be adjusted according to the position of the carriage 25. In actuality, the conduit 26 comprises a plurality of conduits nested within a single flexible housing to provide for the transmission of fluid under pressure, electrical energy and signals between the operating station 17 and the carriage 25. A sectional view illustrating the conduits nested in the conduit 26 is illustrated in FIGURE 2.

Figure 2:
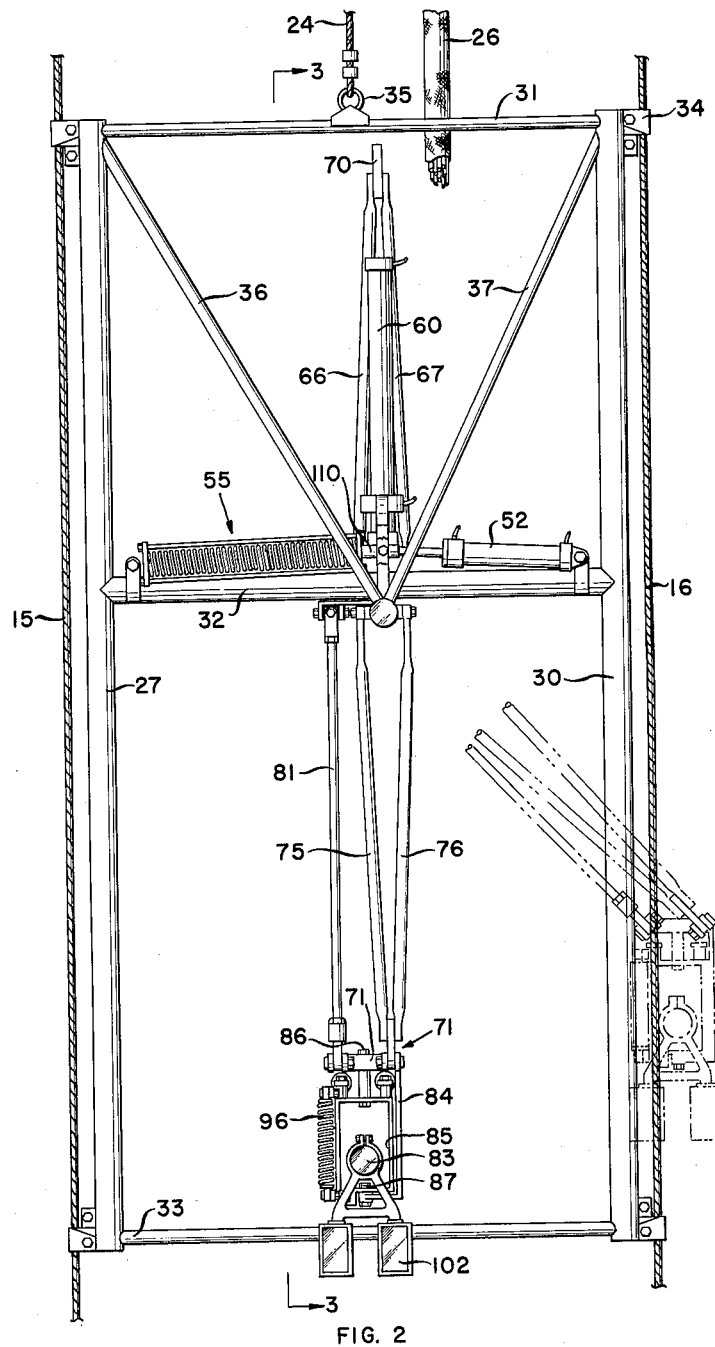
FIGURE 2 is a detailed elevational view of the carriage of the invention, illustrating the boom mounted on the carriage in both its normal position and a laterally projected position.
Figure 3:
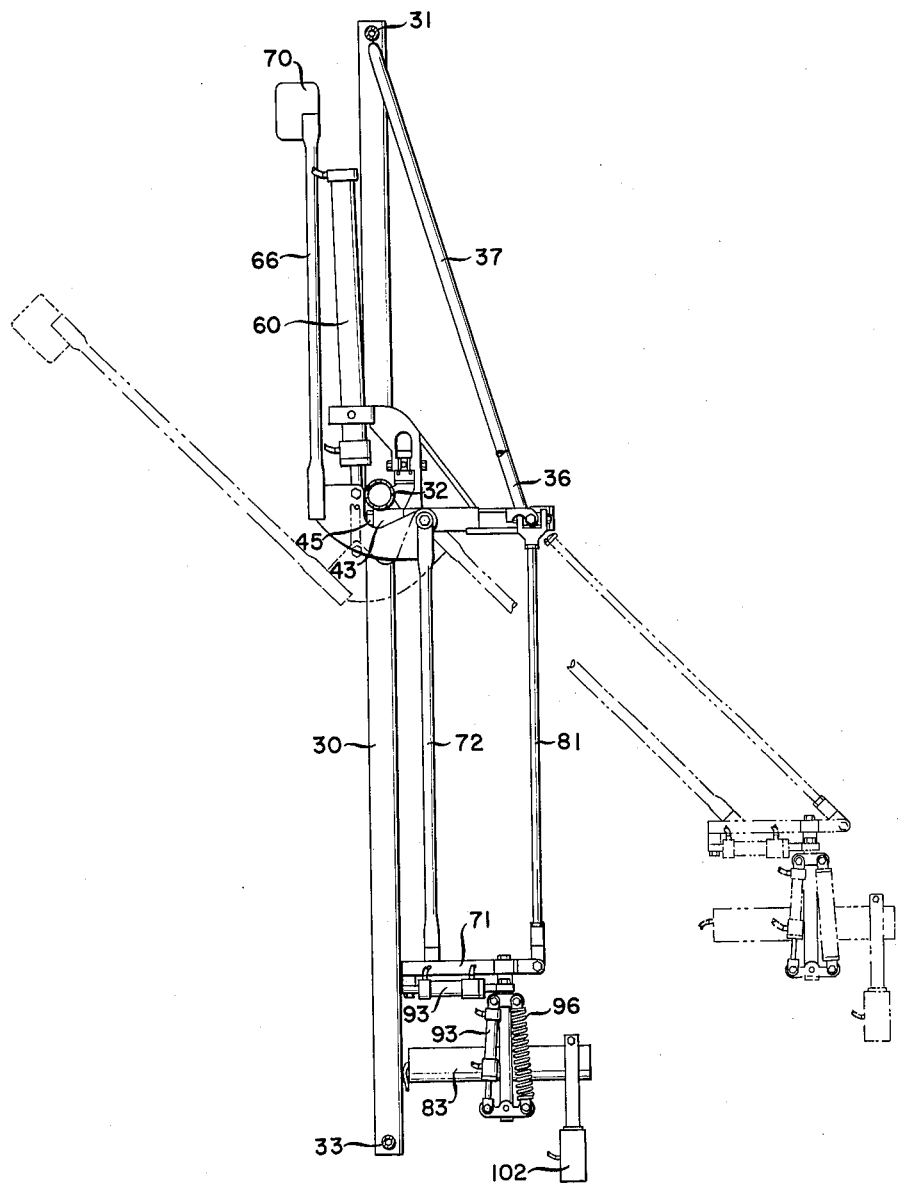
FIGURE 3 is a detailed vertical section taken on line 3—3 of FIGURE 2, with parts being omitted for clarity, showing the boom mounted on the carriage in its neutral position and a forwardly extended position.

Reference is now made to the detailed structure of the observation carriage 25, as viewed from the front and side in FIGURES 2 and 3, respectively. The carriage includes a rigid frame work comprising vertically extending tubular sections 27 and 30 connected by horizontal tubular sections 31, 32 and 33 fixed thereto, as by welding. Guide elements 34, as will be developed subsequently with respect to FIGURE 12, are secured to the upper and lower ends of the sections 27 and 30 and slidably engage the guide lines 15 and 16 to facilitate guided movement of the carriage with respect to the lines. The hoisting cable 24 is secured to the carriage through means of an eye 35 fixed to the tubular section 31 at the mid portion thereof.

The framework of the carriage 25 further includes a pair of tubular elements 36 and 37 fixed to the sections 27 and 30, respectively, and extending inwardly therefrom in converging relationship. As illustrated in FIGURE 10, the inner ends of the elements 36 and 37 are welded to a sleeve bearing 40. The bearing 40 has extending therethrough a cylindrical shaft 41, which shaft has an enlarged head 42 at one end thereof spaced forwardly of the bearing 40 and a threaded end spaced rearwardly of the bearing and fixedly secured to the tubular section 32. The threaded end of the shaft 41 is secured to the section 32 through a second sleeve bearing 43 welded to the section 32 through an arcuate segment 44. As can be seen in FIGURE 3, the threaded end of the shaft 41 extends through the second bearing 43 and is retained in assembly by a nut 45. It is noted that the tubular element 36 is actually secured to the bearing 40 through a plate 46 fixed to the bearing and extending laterally therefrom. The plate 46 has a bifurcated end thereon adapted to receive a linkage, as will be developed subsequently.

FIGURE 10 illustrates a perspective detail of the lateral and forward projection structure of the carriage, as received on the aforediscussed framework. The projection structure includes a yoke 47 having a pair of spaced sleeves 50 and 51 pivotally received on the shaft 41 for rotational movement with respect thereto. The sleeves 50 and 51 are received intermediate the bearings 43 and 40 and the bearing 40 and head 42, respectively, and are fixedly secured together by a strap or shoe 52 welded therebetween. In order to impart pivotal movement to the yoke with respect to the framework of the carriage, a double acting boom swing cylinder 52 is pivotally secured to the tubular section 32 with the motion imparting piston rod 53 thereof pivotally secured to the yoke through means of a bolt 54. The yoke 47 is maintained in the neutral vertical position illustrated in FIGURES 2 and 10 by a spring cell 55 pivotally secured between the yoke and the tubular section 32. The detailed structure of the spring cell 55 will be developed subsequently with respect to FIGURES 4, 5 and 6. From the above-developed relationship between the framework of the carriage; and the yoke, swing cylinder and spring cell cooperating therewith, the manner in which the cylinder 52 may be activated to pivot the yoke 47 and any components secured thereto about the axis of the shaft 41 is believed apparent.

Forward projection of elements secured to the carriage is accomplished through means of a cradle 56 pivotally secured to the yoke 47 by a pair of studs 57 extending laterally from the sleeve 50. Motion is imparted to the cradle 56 through means of a double acting hydraulic boom extension cylinder 60 pivotally carried by the yoke 47 on transversely extending dolls 61. The cylinder 60 operatively engages the cradle 56 through a pivotal connection 62 between the rearward end of the cradle and the piston rod 63 of the cylinder. As can be seen from the sectional view of the cylinder 60 shown in FIGURE 10, and the diagrammatic view shown in FIGURE 13, the piston rod 63 is normally urged to a retracted position by a compression coil spring 64, and extension of the piston rod 60 is limited by a stop sleeve 65 received therearound. The spring 64 has known characteristics whereby the pressure imparted thereto through the rod 63 may be directly correlated to the degree of extension of the rod. These characteristics, as will be developed subsequently, are utilized in the control system of the invention. Through the arrangement of the cylinder 60 and the pivotally mounted cradle 56, the cradle is normally held in the retracted position illustrated in FIGURE 10 and may be selectively pivoted about the studs 57. Movement of the cradle 56 and any elements operatively secured thereto is stabilized by the counterbalance arms 66 and 67 fixedly secured to the cradle and extending upwardly therefrom. This movement is further stabilized by a rudder 70 fixedly secured to the converging ends of the arms 66 and 67.

Referring now to the structure secured to the carriage for lateral and forward projection with respect thereto through the aforedescribed yoke and carriage arrangement. Basically, this structure comprises a camera mount 71 operably secured to the yoke 47 and cradle 56 through a parallel linkage arrangement. The linkage is illustrated in respective detail in FIGURES 10 and 11 and is shown in front and side view in FIGURES 2 and 3, respectively. The linkage includes rear links 72 and 73 fixedly secured to the cradle 56, as by welding, and extending downwardly therefrom in converging relationship to a universal type pivotal connection 74 with the camera mount 71. The linkage further includes a pair of forward lines 75 and 76 pivotally mounted on the sleeve 51 by transversely extending studs 77 and 78. The links 75 and 76 extend downwardly from the sleeve 51 in a direction parallel to the links 72 and 73 to a universal type connection 80 with the camera mount 71. To complete the linkage, a link 81 is secured to the bifurcated end of the plate 46 through a universal type connection 79. The link 81 extends downwardly from the plate 46 in a direction parallel to the direction in which the links 75 and 76 extend to a universal type connection 82 with the mount 71. It is noted that the universal type connections at the terminal ends of linkage 81, combinations 72–73 and 75–76 are arranged so as to retain relative parallel relationship.

From the above described parallel linkage, as can be clearly viewed from FIGURES 2 and 3, the manner in which the linkage is utilized to project the camera mount forwardly and/or laterally from the carriage is believed apparent. In order to project the mount laterally, as illustrated in phantom lines in FIGURE 2, it is merely necessary to activate the cylinder 52 to pivot the yoke 47 about the axis of the shaft 41. The camera mount is projected forwardly, as illustrated in phantom lines in FIGURE 3, by activating the boom extension cylinder 60 to pivot the cradle 56 about the studs 57. The camera mount is maintained and returned to its normal retracted position, illustrated by the solid lines in FIGURES 2 and 3, through means of the compression spring 64 in the cylinder 60 and the spring cell 55 disposed opposite the cylinder 52. The detailed operation of the spring cell 55 will be developed subsequently with respect to FIGURE 4. At this point, it is noted that the parallel linkage arrangement maintains the camera mount 71 in fixed planar orientation with respect to the plane defined by the interconnected tubular sections 27 and 30 to 33 of the carriage. More specifically, the linkage functions to maintain the camera mount 71 in a plane perpendicular to the direction in which the guide lines 15 and 16 extend. Thus, the linkage facilitates the accurate positioning of the camera mount with respect to the guide lines, as will be developed in more detail subsequently.

Referring now to FIGURE 11, therein is illustrated a detailed view of the camera mount 71, showing a television camera 83 secured thereto for panning and tilting movement. The securing arrangement between the mount 71 and camera 83 includes a right-angle shaped member 84 having one leg fixed to the mount 71 in a position perpendicular thereto and the other leg spaced from the mount in a position parallel thereto. A substantially box-shaped frame 85 is received in the space between the mount 71 and member 84 for pivotal movement about an axis normal to the mount, as defined by the pivots 86 and 87 extending between the frame 85 and the mount 71 and member 84, respectively. The securing arrangement between the mount 71 and camera 83 further includes a camera clamp 90 fixed to the outer periphery of the camera and having an end 91 pivotally secured to the frame 85 by a stud 92 passing therethrough.

Through the pivotal relationship between the mount 71 and frame 85, and the clamp 90 and frame 85, the camera 83 is held by the mount 71 for both panning and tilting movement with respect thereto. Panning movement is imparted by a double-acting hydraulic cylinder 93 having one end 94 pivotally secured to the mount 71 and the extensible piston rod 95 thereof pivotally secured to the frame 85. The frame 85 and cylinder 93 are maintained in the neutral position illustrated in FIGURE 11 by a spring cell 96 having one end pivotally secured to the rearward end of the mount 71 and the other end pivotally secured to the frame 85 through the connection 97. The detailed structure of the spring cell 96 will be developed subsequently with respect to FIGURE 7.

Tilting movement is imparted to the camera 83 through a mechanism corresponding substantially to that used for panning. This mechanism comprises a bar 100 fixed to the upper end of the frame 85 and a lever 101 fixed to the pivot stud 92 extending pivotally through the frame 85. A cylinder 93a, corresponding identically to the cylinder 93 of the panning mechanism, is pivotally secured to the the bar 100 and the piston rod thereof is pivotally secured to the lever 101, whereby extension and retraction of the cylinder functions to turn the stud 92 and thus tilt the camera 83. The camera is maintained in the neutral position of tilt illustrated in FIGURE 11 by a spring cell 96a identical to the cell 96 of the panning mechanism, having one end pivotally secured to the bar 100 and the other end pivotally secured to the lever 101 at a position opposed to that of the pivotal connection of the piston rod 95. The manner in which the pan and tilt mechanism is utilized in combination with the aforedscribed boom extension mechanism to control direction of the camera 83 will be developed in more detail with respect to the operation of the carriage and its supporting structure. At this point, it is noted that the camera 83 has secured to the end thereof a pair of lamps 102. These lamps move with the camera 83 to illuminate its area of focus, since the ambient light in the underwater environment in which the camera is normally used is seldom sufficient to support viewing through the camera.

Referring now to FIGURE 4, therein is illustrated a detailed vertical section of the boom swing spring cell 55 referred to previously with respect to FIGURES 2 and 10. Basically, the spring cell 55 comprises a rod 105 extending slidably through a pair of spaced end plates 106 and 107. The rod 105 has a bushing receiving bearing element 110 threadably secured to the end thereof extending through the plate 106, and the plate 107 has fixedly secured thereto a pair of spaced bushing receiving bearing elements 111 and 112. As illustrated in FIGURES 2 and 10, the element 110 and the pair of elements 111 and 112 are adapted to be pivotally secured to the yoke 47 and the tubular section 32, respectively. The spring cell 55 further includes a pair of through bolts or tie rods 113 threadably received in the end plate 107 and slidably received in the end plate 106, and a compression coil spring 114 interposed between these plates in coaxial relationship with respect to the rod 105. Through the latter arrangement, compressive forces imparted to the end plates through the bearing elements secured thereto function to slide the end plate 106 towards the plate 107 and, thus compress the spring 114. During compression of the spring 114, the rod 105 is extended through the plate 107 and between the bearing elements 111 and 112.

In order to provide for resilient extension of the spring cell 55, a sleeve 115 is slidably received around the rod 105 and fixedly secured to the end plate 107, as by welding. The sleeve 115 has a compression coil spring 117 coaxially received therearound between a stop collar 120 threadably received on the inner end thereof and a three-fingered stop element 121 secured to the rod 105 by a nut 123. As clearly illustrated in FIGURES 5 and 6, the sleeve 115 and end plate 107 have slots 124 and 125, respectively, extending therethrough in alignment with the fingers of the stop element 121. Through the latter arrangement, tension applied to the bearing element 110 will function to pull the stop element 121 through the slots 124 and 125, thus compressing the spring 117 and expanding the spring cell.

From the description of the spring cell 55, it is believed apparent that it provides controlled opposition to the operation of the cylinder 52 and also cooperates with the cylinder to return the yoke 47 and the components secured thereto to a neutral position. Furthermore, the springs within the cell 55 have definite and known characteristics which control the amount of pressure that must be applied to the cylinder 52 to impart a preselected degree of movement to the yoke 47. It is through these known characteristics of the springs and their relationship to the pressures imparted to the cylinder 52 that the lateral movement imparted to the camera 83 may be accurately controlled and observed, as will be developed subsequently with respect to the control system of the invention. It is noted that the opposing springs 114 and 117 are pre-compressed in the normal position illustrated in FIGURE 4 and that in operation the springs do not act against each other.

Referring now to FIGURE 7, therein is illustrated a detailed vertical section of the spring cell 96, corresponding identically to the cell 96a. In this figure, the cell is shown in the neutral position in which it functions to maintain the camera in the straight-ahead position with respect to the mount 71, as illustrated in FIGURE 11. Basically, the cell 96 comprises a pair of spaced end plates 126 and 127 secured together by tie rods or through bolts 130 extending slidably through the plate 126 into threaded engagement with the plate 127. The rods 130 step down in diameter at the intermediate portions thereof to form shoulders 131 and have limiting nuts 132 secured to the ends thereof extending through plate 126. The spring cell 96 further includes a shaft 133 extending slidably through the end plate 126 and having a bearing element 134 secured thereto in a position wherein it limits inward extension of the shaft by seating against the plate 126. The end plate 127 has a bearing element 135 fixedly secured thereto in a position opposed to the element 134, whereby the elements 134 and 135 may be utilized to mount the spring cell in the positions illustrated in FIGURE 11. The end plate 127 also has secured thereto an inwardly extending rod 136 dimensioned to be slidably received in a cylindrical recess 137 formed in the inner end of the shaft 133.

In order to provide for resilient movement of the bearing element 134 with respect to the element 135, a pair of plates 140 and 141 are received on the intermediate portion of the shaft 133. The ends of the plate 140 extending laterally of the shaft 133 are slidably received on the enlarged portions of the tie rods 130 and the ends of the plate 141 extending laterally of the shaft 133 are slidably received on the narrow portions of the rod 130 below the shoulder 131. The ends of the plate 141 received on the rods 131 are formed with openings of a diameter sufficient to permit sliding of the plate on the narrow portions of the rods 130, while preventing movement of the plate beyond the shoulder 131 by abutment therewith. The shaft 133 has a snap ring 142 secured thereto to prevent the plate 140 from sliding below the mid portion of the shaft. A shoulder 143 is formed in the shaft 133 above the plate 141 to prevent the plate 141 from sliding beyond the mid portion of the shaft. To conclude the structure through which the plates 140 and 141 provide for resilient movement between the bearings 134 and 135, compression coil springs 144 and 145 are interposed between the plates 126 and 140 and the plates 127 and 141, respectively.

From the foregoing description of the structure of the cell 96, the resilient extension and retraction thereof is believed apparent. Specifically, when the bearing elements 134 and 135 are subjected to compressive forces, the shaft 133 is forced downwardly thus forcing the shoulder 143 against the plate 141 and compressing the spring 145. It is noted that during the latter operation, the distance between the plate 126 and plate 140 remains constant and thus the spring 144 remains inactive. Extension of the spring cell occurs when the bearing elements 134 and 135 are subjected to tensile forces and the shaft 133 is pulled through the plate 126. Upon such extension, the snap ring 142 abuts against the plate 140 and the spring 144 is compressed between the plates 126 and 140. It is noted, that during extension of the cell the distance between the plates 127 and 141 remains constant and, thus the spring 145 remains inactive.

In operation, the spring cells 96 and 96a are mounted in opposed relation to the pan and tilt cylinders 93 and 93a, respectively, as illustrated in FIGURE 11. When mounted in this relationship, the cells function to maintain the camera 83 in the neutral forwardly extended position and to resist movement imparted to the camera through means of the cylinders 93 and 93a. The degree to which the spring cells resist the cylinders may be accurately determined by utilizing springs 144 and 145 of specific and known characteristics. By utilizing such springs, the amount of pressure imparted through the cylinders 93 and 93a may be directly correlated to the degree of compression of the springs 144 and 145 and in turn directly correlated to the pan and tilt position of the camera 83. Through utilization of the known characteristics of the springs in the cells 96 and 96a, and their relationship to the pressures in the cylinders 93 and 93a, the pan and tilt mechanism secured to the mounting plate 71 may be selectively controlled, as will be developed subsequently with respect to the control system illustrated in FIGURE 13.

FIGURE 12 illustrates a perspective view of one of the guide elements 34 in condition to receive a guide line. The guide element comprises a base member 146 fixed to the tubular section of the carriage as by welding, and having a pivot bolt 147 extending through the lower end thereof and a locking bolt 150 threaded into the upper end thereof. The outer side of the base member 146 has an arcuate channel 151 formed therein having a diameter slightly larger than the guide lines 15 and 16 and an axis extending parallel to the axis of the tubular section on which the base member is mounted. In order to secure a guide line within the channel 151, a locking element 152 comprising a pair of spaced side plates 153 and 154 and an intermediate channelled shoe 155 is pivotally mounted on the bolt 147. The plate 154 has a recessed slot 156 formed therein, which slot is adapted to be engaged by the locking bolt 150 when the locking element is pivoted into the closed position, as illustrated in FIGURE 2.

In application of the guide element 34 to the system of the present invention, a guide line is first directed into the channel 151 and the locking element 155 is swung into the closed position illustrated in FIGURE 2. After the locking element 152 is swung into the closed position, the locking bolt 150 is tightened into the recessed slot 156, thus locking the base member 146 and locking element 152 in the closed position. In the latter position, the channel 151 and the channel in the shoe 155 form a closed tubular cylinder having an internal diameter slightly greater than the guide line received therein. Thus, the guide elements 34 facilitate quick attachment of the carriage 25 to the guide lines 15 and 16 while also providing for sliding movement of the carriage with respect to the guide line.

Referring now to FIGURE 13, therein is illustrated a schematic representation of the control system for the carriage of the present invention. As illustrated, the system is shown with fluid conduits communicating with the opposed ends of the double acting cylinders used to impart motion to the camera pan and tilt mechanism and the boom swing and extension mechanism. It is to be understood that in actual application of the control system, these conduits extend from the operating station 17 to the observation carriage 25, and that the control valves and indicators secured to the conduits, to be developed subsequently, are located on the operating station. FIGURE 2 illustrates the flexible conduit 26 through which the nested conduits communicating with the cylinders carried by the carriage extend from the station 17 to the carriage 25. Although the conduits nested in the conduit 26 and the conduits communicating with the opposed ends of the operating cylinders on the carriage are shown in broken section for the sake of clarity, the conduits nested in the conduit 26 will actually communicate with the conduits on the opposed ends of the cylinders.

The system shown in FIGURE 13 includes a main pressure line or conduit 157 extending from a source of pressure, such as a pump, to the control valves for the boom and pan and tilt actuation cylinders. The conduit 157 has a pressure reduction valve 160 interposed therein and a pair of relief valves 161 and 162 communicating therewith on opposed sides of the valve 160. After its connection with the relief valve 162, the conduit 157 is split into lines 163 and 164 which lines have control valves 165 and 166, respectively, interposed therein. The line 163 branches into lines 169 and 170 which communicate with four-way cylinder control valves 171 and 172, respectively, adapted to control the flow of fluid under pressure to the boom swing and boom extension cylinders. In a like manner, the line 164 branches into lines 173 and 174 communicating with four-way cylinder control valves 180 and 181, respectively, adapted to control the flow of fluid under pressure to the camera pan and tilt cylinders. Each of the valves 171, 172, 180 and 181 also communicates wtih a line 182 leading to a sump. Through the line 182, fluid expended from the cylinders may be returned to the accumulator for recycling in the fluid pressure system. A rotary four-way control valve is illustrated diagrammatically at 180. However, it is to be understood that the four-way control valves may take other forms, such as slide valves, without departing from the invention.

As can be seen from FIGURE 13, fluid lines 183 and 184 communicate between the valve 172 and the opposed ends of the boom extension cylinder 60. In a like manner, lines 185 and 186, lines 187 and 188, and lines 190 and 191 communicate with the boom swing cylinder, the camera tilt cylinder, and the camera pan cylinder, respectively. Through the latter lines, and the four-way control valves cooperating therewith, fluid under pressure may be directed to either end of the cylinders, returned to the sump, or blocked completely. Thus, the cylinders may be either extended, retracted, or allowed to assume a neutral position. The latter position is facilitated through means of the spring or spring cells cooperating with the cylinders, as described supra. The degree to which the cylinder 160 is extended and the cylinders 52, 93 and 93a are either extended or retracted may be observed through means of pressure gauges 192 interposed in the fluid pressure lines extending between the cylinder control valves and the cylinders. As was developed previously, the springs in the spring cells cooperating with the cylinders and the spring in the cylinder 60 have definite and known characteristics whereby the amount of pressure imparted to the cylinders may be directly related to the degree of spring compression and the resultant degree of extension or retraction of the cylinder cooperating with the spring or spring cell. Thus, the pressure readings on the gauges 192 may be directly related to the position of the boom in the camera pan and tilt mechanism. Preferably, the gauges 192 are calibrated so that the position of the boom and pan and tilt mechanism may be read directly, rather than indirectly through pressure readings.

With the use of the above-described control system, the position of a camera secured to the carriage 25 may be accurately controlled and determined from a location remote from the carriage, such as the operating station 17. In addition to this control system, the winch 22 is selectively controlled to determine the depth of the carriage 25 in the body of water 10. Preferably, the reeling mechanism 22 is provided with an indicator to show the length of cable 24 running to the carriage, and thus indicate the depth of the carriage in the body of water. In addition to the control system for the carriage components and the indicator for the winch 22, the operating station 17 carries a television receiver to receive signals from the camera 83. This receiver functions both as a means for observing underwater installations in the area of the camera and as an indicator of the relative position of the camera with respect to the underwater installation.

The operation of the inspection system of the invention will now be described with reference to its application to the underwater installation illustrated in FIGURE 1. At the commencement of this application, it is assumed that the operating station 17 is positioned above the underwater installation, and that the guide lines 15 and 16 are in the operative position illustrated. Initially, the carriage 25 is threaded onto the guide lines through means of the guide elements 34 and the carriage is held in a suspended position within the well 23 by the cable 24. The conduit 26 also assumes a position extending between the operating station and the carriage, as illustrated in FIGURE 1. At this point, it is noted that the conduit 26 carries transmission lines communicating with the camera 83 and the lamps 102 in addition to the flexible fluid conduits extending therethrough. Through the latter provision, power and signals are transmitted between the operating station and the camera and camera illuminating lamps. With the carriage 25 suspended in the well 23, the winch 22 may be activated to lower the carriage down the lines 15 and 16. As lowering commences, the camera 83 may be activated at any desired time through control switches carried by the operating station 17 and communicating with the transmission lines extending between the station and the carriage. The switches or control means for activation of the camera are of a conventional nature well within the province of those skilled in the electrical arts. Naturally, activation of the camera 83 will be accompanied by illumination of the lamps secured thereto and any desired motion imparted through the pan and tilt mechanism and the projectable boom. The latter operations are controlled from the operating station through the system illustrated in FIGURE 13. The position of the camera relative to the underwater installation to be observed may be determined by observation of the gauges 192 and the television receiver carried by operating station 17.

To conclude, from the foregoing description of the structure and application of the present invention, it is believed apparent that it provides a means whereby underwater installation may be observed regardless of their depth. The information obtained from this observation is vitally useful in the inspection of such installations and the carrying out of operations thereon, such as adjustments, changes and repairs. Specifically, with the carriage 25 positioned adjacent to the production assembly 12, the operation of equipment used in working the assembly may be readily observed through means of the camera carried by the carriage.

The foregoing description of the invention is, however, merely intended to be explanatory thereof. Various changes in the details of the described system and its application may be made, within the scope of the appended claims, without departing from the spirit of the invention. Therefore, it is not intended that the invention be limited to its application in the observation of production assemblies, nor to the specific internal details of the motion-imparting structure used to control the positioning of the television camera. For example, it is anticipated that the system may find use in observing other underwater installations, such as producing stations and trap farms. It is also anticipated that the details of the fluid and spring motion imparting components may be varied without departing from the invention.

I claim as my invention:

1. An apparatus for use in observing installations submerged in relatively deep bodies of water, comprising:
   (a) a carriage having means secured thereto to guide it into close proximity with a submerged installation to be observed;
   (b) a boom pivotally mounted on said carriage for universal movement with respect thereto to facilitate the projection of a portion of said boom with respect to said carriage;
   (c) motion-imparting means operatively connected to said carriage and to said boom to pivot said boom selectively with respect to said carriage;
   (d) a camera mounting member mounted on said projectible portion of said boom, said boom including means for maintaining said camera mounting member in fixed planar orientation with respect to said carriage; and
   (e) a camera mounted on said camera mounting member.

2. An apparatus according to claim 1 wherein said camera is pivotally mounted on said camera mounting member for movement with respect thereto about a pair of normal axes; and, motion-imparting means operatively connected to said camera mounting member and camera to selectively pivot said camera with respect to said camera mounting member.

3. An apparatus according to claim 2, including lighting means operatively associated with said camera to illuminate its area of focus.

4. An inspection system for observing an installation submerged in a relatively deep body of water, comprising:
   (a) an operating station located at the surface of the body of water at a position substantially above the submerged installation;
   (b) at least one guide element extending between the operating station and the submerged installation;
   (c) a carriage slidably engaging said guide element and having means secured thereto for selectively controlling its depth within the body of water;
   (d) a boom pivotally mounted on said carriage for universal movement with respect thereto to facilitate the projection of a portion of said boom with respect to said carriage;
   (e) motion imparting means operatively connected to said carriage and boom to selectively pivot said boom with respect to said carriage;
   (f) a camera mounting member mounted on said projectible portion of said boom, said boom including means for maintaining said camera mounting member in fixed planar orientation with respect to said carriage; and
   (g) a camera mounted on said camera mounting member;
   (h) transmission means cooperating between the operating station and carriage to transmit images from said camera to the operating station and operating signals from the operating station to said motion imparting means;
   (i) control means carried by the operating station to selectively control said transmission means.

5. A system according to claim 4 wherein said camera is pivotally mounted on said camera mounting member for movement with respect thereto about a pair of normal axes; and motion imparting means operatively engaging said camera mounting member and said camera and cooperating with said transmission and said control means to selectively pivot said camera with respect to said camera mounting member.

6. An inspection system for observing an installation submerged in a relatively deep body of water, comprising:
   (a) an operating station located at the surface of the body of water at a position substantially above the submerged installation;
   (b) at least one guide line extending between the operating station and the submerged installation;
   (c) a carriage slidably engaging said guide line and having a supporting line secured thereto and extending to a raising and lowering mechanism on the station;
   (d) a boom mounted on said carriage for pivotal movement with respect thereto about a pair of normal axes to facilitate the projection of a portion of said boom with respect to said carriage;
   (e) motion-imparting means operatively connected to said carriage and boom to selectively pivot said boom about said normal axes;
   (f) a camera mounting member mounted on said projectible portion of said boom, said boom including means for maintaining said camera mounting member in fixed planar orientation with respect to said carriage;
   (g) a camera mounted on said camera mounting member;
   (h) lighting means operatively associated with said camera to illuminate its area of focus;
   (i) transmission means extending between the operating station and carriage to conduct television signals from said camera to the operating station and power from the operating station to said camera, lighting and motion-imparting means; and,
   (j) control means carried by the operating station and cooperating with said transmission means to selectively control the signals and power conducted therethrough.

7. A system according to claim 6 wherein said television camera is pivotally mounted on said camera mounting member for movement with respect thereto about a pair of normal axes; and motion-imparting means operatively engaging said camera mounting member and camera and cooperating with said transmission and control means to selectively pivot said camera with respect to said camera mounting member.

References Cited by the Examiner

UNITED STATES PATENTS

| 2,981,347 | 4/1961  | Bauer et al. | 175—40   |
| 3,014,984 | 12/1961 | Jacobson     | 178—6    |
| 3,032,105 | 5/1962  | Reistle      | 166—66.5 |
| 3,066,969 | 12/1962 | Camac        | 178—6    |

DAVID G. REDINBAUGH, *Primary Examiner.*